US006822825B2

(12) United States Patent
Herndon et al.

(10) Patent No.: US 6,822,825 B2
(45) Date of Patent: Nov. 23, 2004

(54) STIFFNESS COMPENSATION FOR A THERMALLY COMPENSATED FLUID DYNAMIC BEARING

(75) Inventors: Troy Herndon, San Jose, CA (US); Jeffry LeBlanc, Aptos, CA (US); Robert Nottingham, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 259 days.

(21) Appl. No.: 10/034,711

(22) Filed: Dec. 28, 2001

(65) Prior Publication Data

US 2002/0149878 A1 Oct. 17, 2002

(51) Int. Cl.[7] ............................. G11B 17/02; H02K 7/08
(52) U.S. Cl. ................................ 360/99.08; 360/98.07; 310/67 R
(58) Field of Search ..................... 360/98.07, 99.08, 360/99.12; 369/258, 264, 270; 310/67 R, 90; 720/696, 698, 699

(56) References Cited

U.S. PATENT DOCUMENTS

| | | | | | |
|---|---|---|---|---|---|
| 4,814,652 A | * | 3/1989 | Wright | .................... | 360/98.07 |
| 5,579,188 A | * | 11/1996 | Dunfield et al. | ......... | 360/99.08 |
| 5,973,878 A | * | 10/1999 | Yoshida et al. | .......... | 360/98.07 |
| 6,066,903 A | * | 5/2000 | Ichiyama | ..................... | 310/90 |
| 6,072,661 A | * | 6/2000 | Schirle | .................... | 360/99.08 |
| 6,373,655 B1 | * | 4/2002 | MacLeod et al. | ......... | 360/99.08 |
| 6,528,909 B1 | * | 3/2003 | Kan et al. | ..................... | 310/52 |

FOREIGN PATENT DOCUMENTS

| | | | |
|---|---|---|---|
| JP | 56-020825 | * | 2/1981 |
| JP | 1-210611 | * | 8/1989 |

\* cited by examiner

*Primary Examiner*—David Ometz
(74) *Attorney, Agent, or Firm*—Raqhunath S. Minisandram; Jesus Del Castillo

(57) ABSTRACT

The present invention provides a hydrodynamic bearing design which is simple and reliable in design, while incorporating a shaft with a plug of high elastic modulus material fitted within a cylinder of a lower elastic modulus material than that of the plug, thereby compensating for temperature variations while maintaining radial stiffness of the system over a wide range of temperatures. The design is relatively inexpensive and easy to replicate in a high volume manufacturing process.

19 Claims, 3 Drawing Sheets

STIFFNESS COMPENSATION FOR A THERMALLY COMPENSATED FLUID DYNAMIC BEARING

CROSS-REFERENCE TO RELATED APPLICATIONS

This application is related to U.S. provisional patent application entitled, "Stiffness Compensation for a Thermally Compensated FDB", invented by Troy Herndon et al. and assigned application Ser. No. 60/251,241, filed Dec. 4, 2000.

BACKGROUND OF THE INVENTION

1. Field of the Invention

The present invention relates to the field of hydrodynamic bearing assemblies of the type, which provides support and rotation for a high-speed spindle element. More specifically, the present invention relates to an improved apparatus for maintaining the stiffness of the shaft in a fluid dynamic (FDB) motor incorporating thermal compensation.

2. Background of the Invention

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle, the information being accessed by means of transducers located on a pivoting arm, which moves radially over the surface of the disk. The read/write heads or transducers must be accurately aligned with the storage tracks on the disk to ensure proper reading and writing of information; thus the disks must be rotationally stable.

During operation, the disks are rotated at very high speeds within an enclosed housing by means of an electric motor, which is generally located inside the hub or below the disks. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disk drive spindles run under conditions that generally guarantee physical contact between raceway and ball, in spite of the lubrication layer provided by the bearing oil or grease. Hence, bearing balls running on the generally smooth but microscopically uneven and rough raceways transmit this surface structure as well as their imperfection in sphericity in the form of vibration to the rotating disk. This vibration results in misalignment between the data tracks and the read/write transducer. This source of vibration limits the data track density and the overall performance of the disk drive system.

Another problem is related to the application of hard disk drives in portable computer equipment, resulting in severely increased requirements for shock resistance. Shocks create relative acceleration between the disks and the drive casing, which in turn show up as a force across the bearing system. Since the contact surfaces in ball bearings are very small, the resulting contact pressures may exceed the yield strength of the bearing material, and leave long-term deformation and damage to the raceway and the balls of the ball bearing.

Moreover, mechanical bearings are not easily scaleable to smaller dimensions. This is a significant drawback since the tendency in the disk drive industry has been to continually shrink the physical dimensions of the disk drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferromagnetic fluids or even air have been utilized in hydrodynamic bearing systems. The reason for the desirability of the use of air is the importance of avoiding the outgassing of contaminants into the sealed area of the head/disk housing. However, air does not provide the lubricating qualities of oil. The relatively higher viscosity of oil allows for larger bearing gaps and therefore looser tolerance standards to achieve similar dynamic performance.

A common type of fluid dynamic bearing comprises a shaft extending through the sleeve or hub with one or more radially extending plates supported from the shaft. A hydrodynamic bearing is provided between the shaft and the bore through the hub, with the fluid, which occupies the gap between the inner surface of the bore and the outer surface of the shaft providing the stiffness for the shaft. Without this stiffness, the shaft is prone to tilting or wobbling over the life of the motor. As a result, any hub or disk supported for rotation by the shaft is prone to wobbling or tilting. Any such tilting or instability in the hub or disk would make reading or writing of data on the disk surface very difficult, and diminish the life of the motor and the disk drive in which it is used.

However, the very fact that a conventional fluid dynamic bearing design relies on the use of a fluid in a very narrow gap between a shaft and surrounding bore for establishing and maintaining radial stiffness creates a problem due to the substantial range of temperatures over which the motor must operate. In known journal bearing designs for the shaft, the temperature of the fluid when the system is at rest may be about 25° C.; in operation, the fluid temperature can be 70° C. or more. Clearly, the viscosity of the fluid will change with the fluid becoming less dense and providing substantially less stiffness for the shaft. Thus, unless elaborate systems are incorporated into the design, it is very difficult to maintain the desired level of radial stiffness for the shaft over the entire range of operating temperatures of the disk drive.

Efforts have been made to modify the fluid used in the fluid dynamic bearing gap to minimize the changes in viscosity with changes in temperature; but such fluids can add to the cost of the bearing and motor, and have not fully achieved the goal of temperature compensation over a wide range of temperatures.

Further, adequate compensation typically cannot be provided over the operating temperature range simply by choice of the material for the shaft or the surrounding bore. If no compensation is incorporated into the fluid, then the shaft material would be required to have a high thermal expansion capability; however, both such known materials also have a low material elastic modulus, i.e., they are prone to vending and it is extremely difficult to maintain their stiffness.

Therefore, the problem remains of developing a means for maintaining the stiffness of the shaft and the journal fluid dynamic bearing, which supports it over a wide range of operating temperatures.

SUMMARY OF THE INVENTION

It is therefore an objective of the present invention to provide a hydrodynamic bearing design, which is simple and reliable in design, while incorporating means for compensating for temperature variations while maintaining the radial stiffness of the system.

It is a further objective of the invention to provide a hydrodynamic bearing design having means for substantially maintaining the stiffness of the shaft used in a single plate fluid dynamic bearing system over a wide range of temperatures.

It is a further related object of the invention to provide stiffness compensation for the shaft in a fluid dynamic bearing system, utilizing a design which is relatively inexpensive and easy to replicate in a high volume manufacturing process.

These and other objectives of the invention are achieved by providing as a part of the fluid dynamic bearing, a central shaft which is rotating inside the bore of the surrounding sleeve or hub, the shaft comprising an internal, high elastic modulus (relatively stiff) shaft/plug inside a highly thermal expansive external cylinder. This shaft assembly (cylinder and plug) typically comprises materials chosen such that the assembly is not as stiff as a single piece solid shaft made of a high modulus material; however, the assembly, especially because of the high thermal expansion external cylinder does allow for greater thermal expansion. This expansion of the outer cylinder with increases in temperature will cause the gap between the outer surface of the cylinder and the inner surface of the bore in which it rotates to be narrowed as temperature increases, compensating for the reduction in viscosity of the fluid which supports the relative rotation of the shaft and sleeve, and maintaining the stiffness of the overall journal style fluid dynamic bearing.

Other features and advantages of the invention will become apparent to a person of skill in the art who studies the following detailed description of a preferred embodiment of the apparatus for the present invention, given in conjunction with the following drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A hydrodynamic bearing based spindle motor that is especially useful in a disk drive is disclosed herein. A primary purpose of the present invention is to modify the design of the spindle motor of the hydrodynamic bearing supported shaft which is the main rotating shaft supporting the rotating spindle and disks so that the lubrication fluid which supports the shaft and sleeve for relative rotation in the bore of a surrounding sleeve or hub does not loose stiffness against radial instability as the temperature of the motor increases. As motor temperature rises, the fluid temperature also rises, reducing the viscosity of the fluid, and therefore, in many prior art designs, the resistance of the shaft to radial instability.

Figure 1:
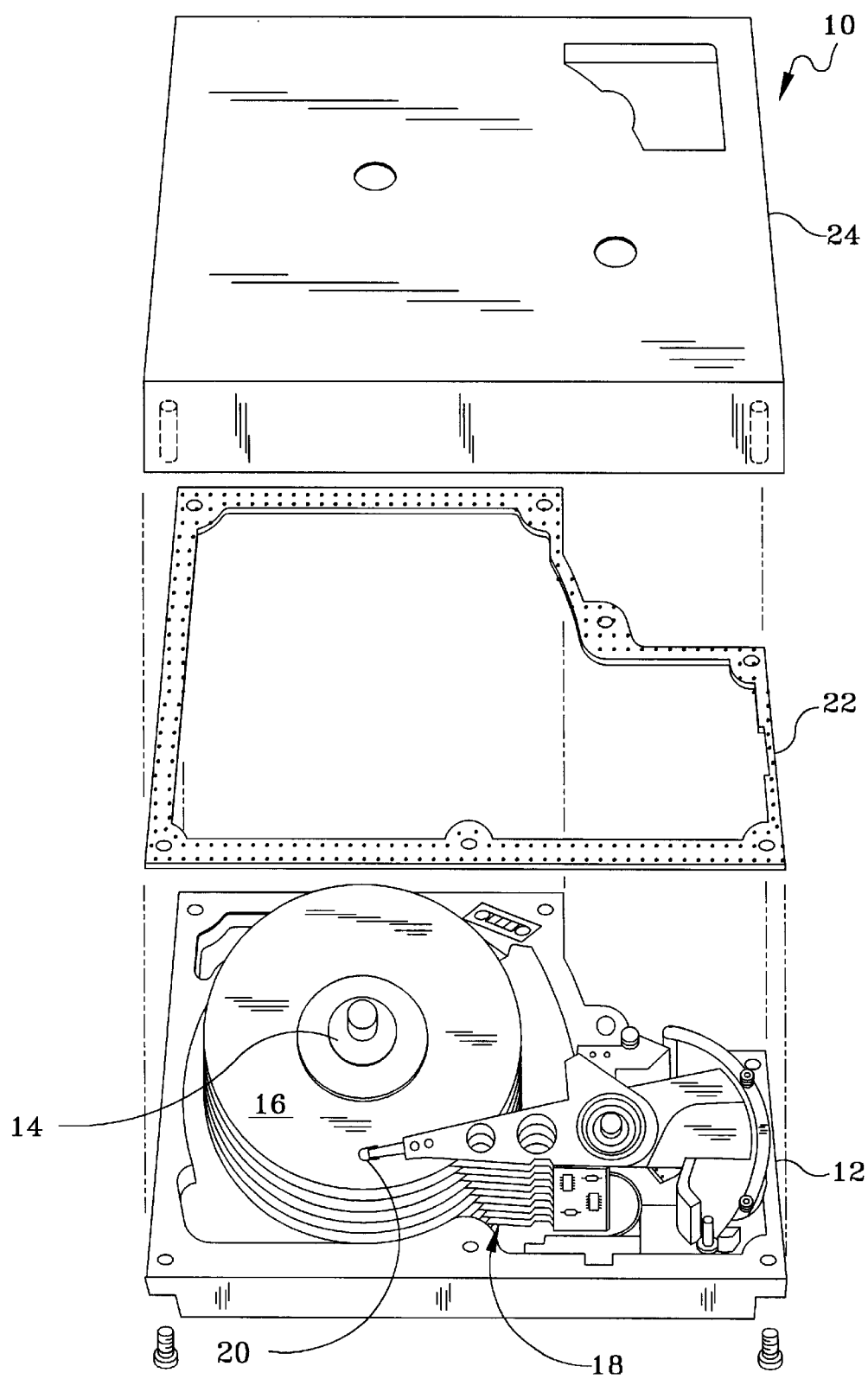
FIG. 1 is a perspective exploded view of a disc drive in which the present invention is useful.

The motor of the present invention, although not limited to use in disk drives, is especially useful therein. Therefore, FIG. 1 shows an exploded perspective view of a disk drive storage system in which the present bearing and/or motor would be useful. FIG. 1 is provided primarily to give an illustrative example of the environment in which this motor is used; clearly, the motor could be used equally well in other designs of disk drives, or other operating environments apart from disk drive technology where stiffness of the shaft against radial instability is important.

In the particular example of FIG. 1, the storage system 10 includes a housing 12 having a spindle motor 14, which rotatably carries the storage disks 16 which are to be discussed in detail below. An armature assembly 18 moves transducers 20 across the surface of the disks 16. The environment of disks 16 is sealed by seal 22 and cover 24. In operation, disks 16 rotate at high speed while transducers 20 are positioned at any one of a set of radially differentiated tracks on the surface of the disks 16. This allows the transducers to read and write encoded information on the surface of the disks at selected locations. The disks rotate at very high speed, several thousand rpm, in order to maintain each transducer flying over the surface of the associated disk. In present day technology, the spacing distance between the transducer and the rotating disk surface is measured in micro-inches; thus, it is essential that the disk does not vibrate or tilt away from the plane in which it is designed to rotate. As such, tilting, displacement or vibration could easily disturb the air flow, which is maintaining the flight of the transducer over the surface, or simply cause mechanical contact between the transducer and the disk surface. Such contact would probably damage the disk surface, resulting in the loss of disk storage space. It could even damage the transducer, resulting in loss of use of the disk drive.

Figure 2:
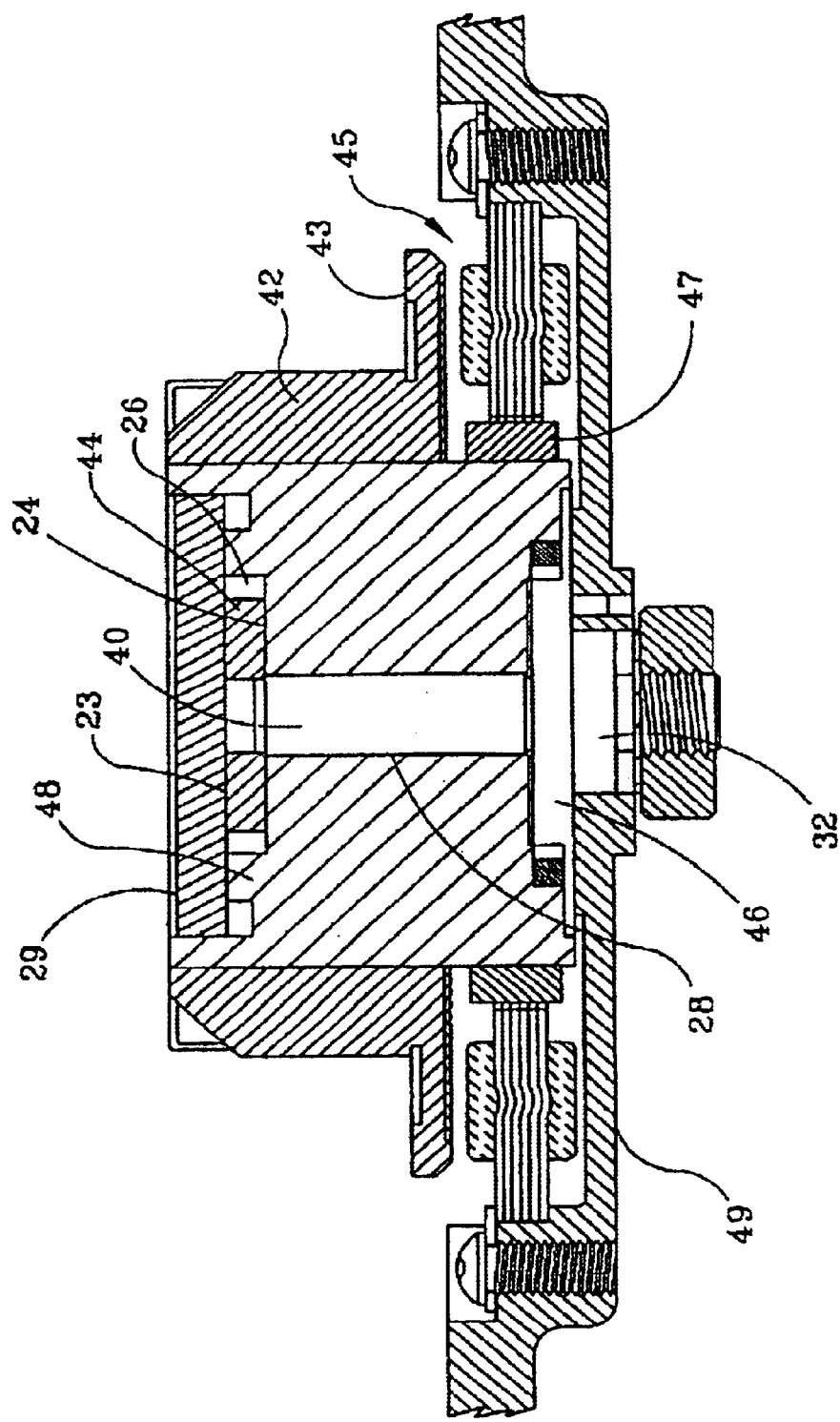
FIG. 2 is a vertical perspective view of a spindle motor incorporated in a disc drive in which the present invention is useful.

Referring next to FIG. 2, this figure is a vertical section through a spindle motor of a type useful in the disk drive of FIG. 1. The basic structure of the motor of FIG. 2, at least as much as is relevant to this invention, includes a stationary shaft 40 and a hub 42 that rotates around the shaft. The hub supports one or more disks on the shoulder 43 for rotation in response to energization of the motor, which lies below the hub and comprises, in part, stator 45 and magnet 47. Energization of the stator coils, as is well known in this technology, will cause rotation of the hub about the shaft.

The shaft 40 includes a thrust plate 44 at one end and terminates in a shoulder 46 at the opposite end, which is supported from the base 49. The hub 42 includes a bushing 48 which houses a counter plate 29 at one end, opposite the thrust plate 44.

In this motor design, fluid is maintained in the gap 28 between the outer surface of the shaft and the inner surface of the bushing 48 in order to maintain the stability of the bushing and hub 42 rotating about the shaft. Fluid is also maintained in the gap 26 between gaps 23 and 24 between the surfaces of the thrust plate 44, the counter plate 29, and the facing surface of the bushing 48 to allow for rotation of the bushing relative to the thrust plate 44 while maintaining the radial stability of the bushing 48 and hub 42. This invention is especially concerned with maintaining the rotational stability of the bushing 48 about the shaft 40 by compensating for the fact that the fluid in the gap 28 will lose some viscosity, and thus, stiffness with changes in temperature.

In known single thrust plate fluid dynamic bearing motors, the shaft is made of steel or the like which, while maintaining stiffness, cannot provide adequate thermal compensation over the operating range because the material (such as steel or equivalent) has a high material elastic modulus; however, such materials will also have a low thermal expansion capability. One of the objectives herein is to provide a material or design for the shaft so that as the viscosity, (i.e., thickness) of the fluid in the gap 28 is diminished with increasing temperature, then by expansion of the shaft 40 with temperature, the gap between the outer surface of the shaft 40 and the inner surface of the bushing 48 is diminished.

Figure 3A:
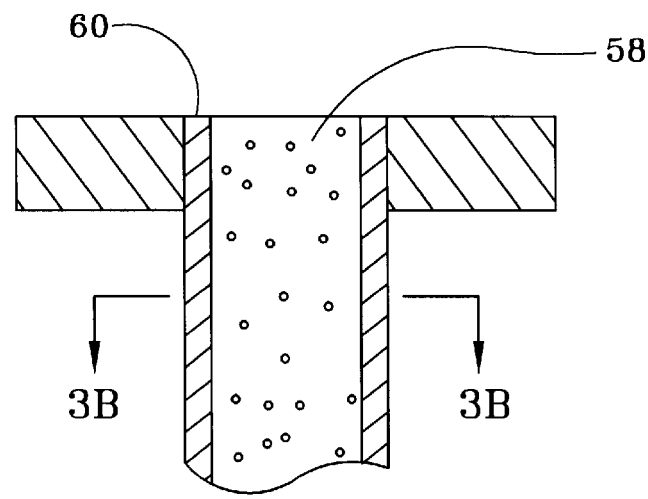
FIG. 3A is a vertical sectional view of an exemplary embodiment of the invention.
Figure 3B:
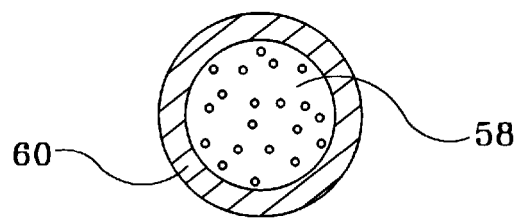
FIG. 3B is a sectional view along the lines A—A of FIG. 3A.

According to the present invention, this objective is achieved by providing an internal, high elastic modulus (relatively stiff) shaft or plug 58 within an external cylinder 60 comprising material having a high thermal expansion capability. This shaft assembly, as shown in FIG. 3A, is not as stiff as a single piece solid shaft made of a high elastic modulus material; however, the assembly of cylinder 60 and plug 58 does provide for greater thermal radial expansion. The shaft assembly also provides the increased stiffness of a thermally-compensated shaft design over the stiffness provided by a single piece solid shaft of a high elastic modulus material having low thermal expansion capability.

The effectiveness of this design in reducing the gap between sleeve and surrounding hub or sleeve with increased temperature while maintaining the stiffness with changes in temperature is demonstrated by the following example:

Using the formula $Q = \dfrac{K_{xz}@70\ C.}{K_{xf}@25\ C.} = \dfrac{\frac{N_2 W_2 L_2 R_2^3}{C_2^3}}{\frac{N_1 W_1 L_1 R_1^3}{C_1^3}} = \dfrac{N_2 C_1^3}{N_1 C_2^3}$ where Case A: (No Thermal Compensation)

$$Q = \frac{(5)(0.004)^3}{(18)(0.004)^3} = 0.28$$

∴ stiffness reduces @ 70 C. where motor operates @ 70 C. to 28% of stiffness @ 25 C.
Case B: (Thermal Compensation)

$$Q = \frac{(5)(0.004)^3}{(18)(0.002823)^3} = 0.79$$

∴ stiffness reduces @ 70 C. to 79% of stiffness @ 25 C.
wherein u is the viscosity of fluid at the temperature; w is the speed of rotation; l is the length of the journal; r is the radius of the shaft; and c is the physical radial gap at the given temperature. This example was worked out using a steel plug 58 with a cylinder of a wear coupled aluminum (Case B) as compared to a steel shaft (Case A) such as is now commonly used.

It should be noted that in addition to the wear coupled aluminum, such as used in the mathematical example, that other high thermal expansion materials are also useful for cylinder 60, such as a phosphor bronze, or other materials having a substantially higher expansion rate than the internal or plug material.

It should further be noted that the thrust plate could be of the same material as the cylinder, or of the plug within the cylinder, or of a third material. In a preferred form, the thrust plate, which does not have the same load bearing requirements as the shaft, would be made of the same material as the shaft cylinder 60.

It should further be noted that the plug 58 extends in a preferred embodiment, both the entire length of the shaft and entirely axially through the thrust plate, to optimize the radial stability of the design. In combination therewith, the thrust plate could be either the material of the plug, the material of the cylinder, or a third material chosen to optimize some combination of temperature response and stiffness.

Figure 3C:
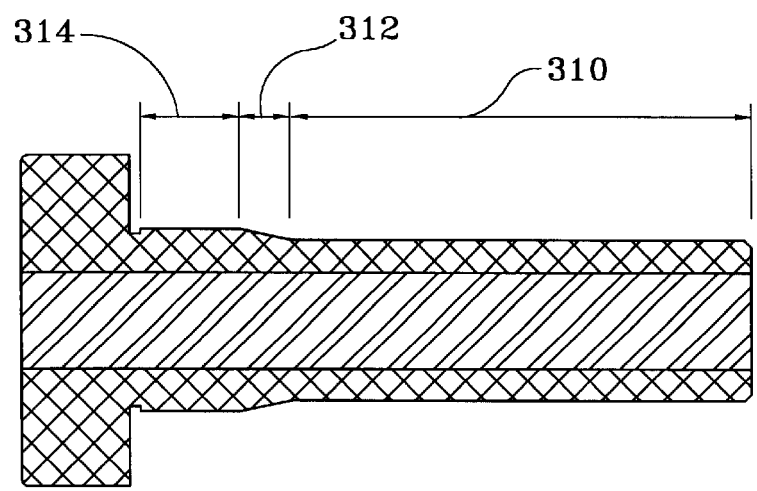
FIG. 3C is a vertical sectional view of an alternative embodiment of the invention.

FIG. 3C illustrates, in vertical sectional view, another alternative embodiment of the shaft and plug combination of the invention, comparing this shaft embodiment to the shaft in the sectional view of FIG. 2, the lower, narrower cross-section portion 310 fits into the base 49 to hold the shaft upright; the intermediate angled wall section 312 is between the journal bearing section 314 and the base insert 310, and defines an angled wall portion of a known capillary seal design. The journal bearing region 314 is wider in cross-section, and comprises the visible portion of the shaft 40 shown in FIG. 2. The capillary seal defined in part by region 312 is provided to prevent the loss of fluid from the journal region along the shaft toward the base.

In another alternative, the plug may extend only a substantial portion of the length of the shaft; this portion would preferably include the region where the journal bearing grooves are located.

Other features and advantages of the invention would be apparent to a person of skill in the art who studies this disclosure. Therefore, the scope of the invention is to be limited only by the following claims.

What is claimed is:

1. A fluid bearing comprising a shaft and surrounding bushing relatively rotatable to one another, the inner surface of the bushing and the outer surface of the shaft defining a gap having lubricating fluid therein, the shaft comprising a plug of a high elastic modulus material and being fitted within a cylinder of material which comprises a material of a lower elastic modulus material and higher thermal expansion capability than the material of the plug, the plug and cylinder extending through and terminating at a surface of the thrust plate.

2. A hydrodynamic bearing as claimed in claim 1, wherein the plug comprises steel, and the cylinder comprises a material selected from the group including aluminum, phosphor bronze or brass.

3. A hydrodynamic bearing as claimed in claim 2, wherein the thrust plate comprises steel.

4. A hydrodynamic bearing as claimed in claim 2, wherein the thrust plate comprises the same material as the cylinder.

5. A fluid bearing comprising a shaft and surrounding bushing relatively rotatable to one another, the inner surface of the bushing and the outer surface of the shaft defining a gap having lubricating fluid therein, the shaft comprising a plug of a high elastic modulus material and being fitted within a cylinder of material which comprises a material of a lower elastic modulus material and higher thermal expansion capability than the material of the plug, wherein the cylinder extends over the outer surface of the plug and terminates adjacent the thrust plate without extending through the thrust plate.

6. A hydrodynamic bearing as claim in claim 5, wherein the shaft comprises first and second regions, the first region of smaller cross-section than the second region, the first region adapted to mate with a base, the second region supporting a journal bearing.

7. A hydrodynamic bearing as claimed in claim 6, wherein the plug comprises steel, and the cylinder comprises a material selected from the group including aluminum, phosphor bronze or brass.

8. A disk drive spindle comprising a shaft having a thrust plate at one end and a bushing surrounding the shaft, the shaft and bushing defining a gap filled with fluid for supporting relative rotation of the shaft and sleeve, the shaft comprising a plug of a high elastic modulus material and being fitted within a cylinder of material which covers the length of the plug and comprises a material of a lower elastic modulus material and higher thermal expansion capability than the material comprising the plug; the plug extending through the thrust plate to a first surface and thee cylinder extending at least to a second surface of the thrust plate.

9. A disk drive as claimed in claim 8, wherein the plug comprises steel, and the cylinder comprises a material selected from the group including aluminum, phosphor bronze or brass.

10. A hydrodynamic bearing as claimed in claim 9, wherein the thrust plate comprises substantially the same material as the cylinder that covers the plug of the shaft.

11. A hydrodynamic bearing as claimed in claim 9, wherein the plug extends the entire length of the shaft and extends through the thrust plate.

12. A hydrodynamic bearing as claimed in claim 11 wherein the shaft comprises first and second regions, the first region of smaller cross-section than the second region, the first region adapted to mate with a base, the second region supporting a journal bearing.

13. A disc drive as claimed in claim 8, wherein the thrust plate comprises steel.

14. A hydrodynamic bearing as claimed in claim 8, wherein the cylinder extends over the outer surface of the plug and terminates adjacent the thrust plate without extending through the thrust plate.

15. A disk drive spindle motor comprising a shaft having a thrust plate at one end and a fixed shoulder at the other end, and including a bushing rotating relative to the shaft and having a hub affixed thereto and rotating with the sleeve for supporting one or more disks in the data storage system, the outer surface of the shaft and the inner surface of the sleeve defining a gap having fluid therein for supporting relative rotation of the bushing and the shaft, and means for providing thermal compensation modifying width of the gap to maintain stiffness of the bearing over a range of operating temperatures wherein the means for providing thermal compensation comprise the shaft comprising a plug of a high elastic modulus material and being fitted within a cylinder of material which comprises a material of a lower elastic modulus material and higher thermal expansion capability than the material of the plug, the plug and cylinder extending through and terminating at a surface of the thrust plate.

16. A hydrodynamic bearing as claimed in claim 15, wherein the plug comprises steel, and the cylinder comprises a material selected from the group including aluminum, phosphor bronze or brass.

17. A hydrodynamic bearing as claimed in claim 15, wherein the thrust plate comprises steel.

18. A hydrodynamic bearing as claimed in claim 15, wherein the thrust plate comprises the same material as the cylinder.

19. A hydrodynamic bearing as claimed in claim 15, wherein the cylinder extends over the outer surface of the plug and terminates adjacent the thrust plate without extending through the thrust plate.

* * * * *